Patented Mar. 27, 1945

2,372,584

UNITED STATES PATENT OFFICE 2,372,584

PROCESS FOR RECLAIMING SCRAP VULCANIZED RUBBER

Walter G. Kirby and Leo E. Steinle, Naugatuck, Conn., assignors to United States Rubber Company, New York, N. Y., a corporation of New Jersey No Drawing. Application March 17, 1943, Serial No. 479,489

9 Claims. (Cl. 260—720)

This invention relates to a process for reclaiming scrap vulcanized rubber at elevated temperatures, more particularly as in the "digester" and "heater" processes.

In the usual "digester" process, a charge of ground rubber and water, or a solution of a cellulose-destroying chemical, such as caustic soda or zinc chloride, is heated under pressure in a closed steam jacketed container equipped with an agitator until the fiber in the scrap is partially or wholly destroyed, and the rubber becomes plasticized. The charge is then washed free from any such added chemicals, and is dried and milled. In the usual "heater" process, ground rubber scrap in a dried or somewhat moistened condition is heated with steam under pressure in trays or pans in an autoclave until the rubber becomes plasticized. The plasticized scrap is then removed from the "heater" and milled. It is customary in both the "digester" and "heater" processes to mix reclaiming oils with the vulcanized scrap in the reclaiming treatment. These oils are a considerable item of expense, and in some types of scrap a comparatively large percent of oils are necessary to sufficiently soften the scrap in the reclaiming operation to give the reclaim a viscosity that is useful for milling and compounding. A large part of the oils added to the vulcanized rubber scrap remains in the finished reclaim and lowers the quality. As a rule, reclaimed rubber high in oil content has a lower tensile strength and decreased wearing properties.

By the present invention scrap rubber may be reclaimed as in the "digester" or "heater" processes in a shorter period of time and with the addition of less reclaiming oils than in the usual reclaiming operations.

According to the present invention there is added to the scrap a small amount of a di (hydroxyaryl) sulphide, generally from .02% to 1% by weight of the scrap. If desired, larger amounts may be added but up to 1% has been found adequate for reclaiming various kinds of scrap. The di (hydroxyaryl) sulphide may be added in any desired form, for example, as a gas or vapor, or as a liquid or a solid, or in suspension or solution in water or in organic solvents, or mixed with the oils or other materials that may also be added in the reclaiming process. The di (hydroxyaryl) sulphide may be a monosulphide, disulphide, or polysulphide, and the two hydro-aromatic groups may be alike or different and may be unsubstituted or substituted, as with alkyl substituents. Examples of the chemicals which may be used according to the present invention are: di (hydroxyphenyl) monosulphide, di (hydroxyphenyl) disulphide, dicresyl monosulphide, dicresyl disulphide, dicresyl polysulphide, di (hydroxynapthyl) disulphide, di (butyl hydroxyphenyl) monosulphide, di (butyl-hydroxyphenyl) disulphide, bis (dimethyl hydroxyphenyl) disulphide, hydroxyphenylcresyl monosulphide and cresyldimethyl hydroxyphenyl disulphide. The reclaiming in the "digester" or "heater" processes may take place at the usual temperatures of from about 300° F. to about 420° F. The addition of the di (hydroxyaryl) sulphide permits a substantial reduction in the amount of reclaiming oil that need be added, and decidedly shortens the time of processing necessary to obtain a reclaim of the desired viscosity.

The effectiveness of a reclaiming operation in recovering scrap vulcanized rubber may be quantitatively shown by means of an instrument widely used for this purpose in the reclaim rubber industry, namely, the Mooney Shearing Disc Plastometer. This device has been described by M. Mooney in Industrial & Engineering Chemistry, an ed. 6, 147 (1934). By means of this device the viscosity of a plastic material in shear may be readily and quantitatively measured. Experience has shown that materials with a Mooney viscosity of 80 to 180 when tested at 180° F. can be readily and efficiently processed on standard rubber working machinery, but that materials of a very high viscosity such as 200 and over when tested at 180° F. cannot be so treated.

The following examples are given in illustration of the invention:

Example 1

Vulcanized rubber scrap was reduced to a desired particle size, and different portions were then mixed with reagents according to each of the following formulations, formulation A being conventional for treatment of this scrap in a "heater," and formulation B being illustrative of the present invention:

|  | A | B |
|---|---|---|
|  | Parts by weight | Parts by weight |
| Ground vulcanized scrap rubber | 100 | 100 |
| Pine oil fraction | 8 | 1.6 |
| Rosin oil | 8 |  |
| Crude dicresyl disulphide |  | 1 |
| Water | 2 | 2 |

Charge A was heated in the "heater" at 406° F. for 15 hours, which is the time necessary to properly reclaim the scrap at this temperature. Charge B was heated at 406° F. for 5 hours. The product of both these treatments after the usual milling is a fully reclaimed rubber of a quality comparable to other standard quality reclaims. Mooney viscosities when tested at 180° F. were 102 and 86 for reclaims A and B respectively. The tensile strengths on reclaims A and B were 620 and 675 lbs. per square inch respectively. The acetone extracts of reclaims A and B were 9.7 and 7.9% respectively.

Example 2

To portions of another grade of ground scrap were added reagents according to the following formulations, formulation C being the usual formulation for this scrap, and formulation D according to the present invention:

|  | C | D |
| --- | --- | --- |
|  | Parts by weight | Parts by weight |
| Ground vulcanized scrap rubber | 100 | 100 |
| Pine oil fraction | 6 | 1 |
| Crude dicresyl disulphide | | .1 |
| Water | 1 | 1 |

Charge C was treated in a "heater" at 388° F. for twelve hours, which was the time needed to reclaim the scrap at this temperature. Charge D was treated in the "heater" at 388° F. for 5 hours. After the usual milling of the thus prepared reclaims, tests showed a Mooney viscosity at 180° F. of 180 and 160 for reclaims C and D respectively. The tensile strengths of reclaims C and D were 1290 and 1460 lbs. per sq. in. respectively. The acetone extracts of reclaims C and D were 6.5 and 6.3 respectively.

These examples illustrate the shorter processing time, and the reduction in the amount of reclaiming oil needed when using the present invention in the "heater" process.

Example 3

Vulcanized rubber scrap containing fiber was reduced to a desired particle size, and different portions were then mixed with reagents according to each of the following formulations, formulation E being conventional for reclaiming of this scrap in a "digester," and F being a formulation according to the present invention for the "digester" process:

|  | E | F |
| --- | --- | --- |
|  | Parts by weight | Parts by weight |
| Vulcanized tire scrap | 100 | 100 |
| Pine oil extract | 12 | 2 |
| Rosin oil | 12 | 3 |
| Crude dicresyl disulphide | | .15 |
| Water | 250 | 250 |

Charge E was heated in the "digester" at 365° F. for 24 hours, which was the time needed to reclaim the scrap at this temperature. Charge F was heated in the "digester" at 365° F. for 16 hours. After removal from the "digester" and washing and drying, the reclaimed scrap was milled in a conventional manner. Tests showed Mooney viscosities at 180° F. of 165 and 160 for reclaims E and F respectively. The tensile strengths were 615 and 610 lbs. per sq. in. for reclaims E and F respectively. The acetone extract for reclaim E was 12.1% and for reclaim F 6.2%.

Example 4

To portions of another grade of comminuted vulcanized rubber scrap were added reagents as shown below, charge G being conventional for this scrap and charge H according to the present invention:

|  | G | H |
| --- | --- | --- |
|  | Pounds | Pounds |
| Ground vulcanized rubber | 13,000 | 13,000 |
| Pine oil extract | 1,300 | 390 |
| Pine tar | 650 | 120 |
| Water | 20,000 | 20,000 |
| Crude dicresyl disulphide | | 15.6 |

Charge G was heated in the "digester" at 406° F. for 12 hours, which was the usual processing time for the scrap at this temperature. Charge H was heated in a "digester" at 406° F. for 9 hours. After removing from the "digester," the reclaimed scrap was washed and dried and milled in the usual manner. Tests showed Mooney viscosities of 127 and 102 for reclaims G and H respectively. The tensile strengths of G and H were found to be 644 and 704 lbs. per sq. in. respectively. The acetone extracts of reclaims G and H were 7.5% and 6.4% respectively.

Examples 3 and 4 illustrate the shorter processing time, and the reduction in the amount of reclaiming oil needed when using the present invention in the "digester" process.

In view of the many changes and modifications that may be made without departing from the principles underlying the invention, reference should be made to the appended claims for an understanding of the scope of the protection afforded the invention.

Having thus described our invention, what we claim and desire to protect by Letters Patent is:

1. A process for reclaiming scrap containing vulcanized rubber which comprises heating in a subdivided condition at a temperature from about 300° F. to about 420° F. The scrap in which has been incorporated a small amount of a di (hydroxyaryl) sulphide, for a time sufficient to reduce the vulcanized rubber to a plastic state where it has a Mooney viscosity substantially less than 200 when tested at 180° F.

2. A process for reclaiming scrap containing vulcanized rubber which comprises heating in a subdivided condition at a temperature from about 300° F. to about 420° F. the scrap in which has been incorporated about .02 to 1% by weight of the scrap of a dicresyl sulphide for a time sufficient to reduce the rubber to a plastic state where it has a Mooney viscosity of 80 to 180 when tested at 180° F.

3. A process for reclaiming scrap containing vulcanized rubber which comprises heating in a subdivided condition at a temperature from about 300° F. to about 420° F. The scrap in which has been incorporated a small amount of dicresyl monosulphide for a time sufficient to reduce the rubber to a plastic state where it has a Mooney viscosity of 80 to 180 when tested at 180° F.

4. A process for reclaiming scrap containing vulcanized rubber which comprises heating in a subdivided condition at a temperature from about 300° F. to about 420° F. The scrap in which has been incorporated a small amount of dicresyl disulphide for a time sufficient to reduce the rubber to a plastic state where it has a Mooney viscosity of 80 to 180 when tested at 180° F.

5. A process for reclaiming scrap containing vulcanized rubber which comprises heating in a subdivided condition at a temperature from about 300° F. to about 420° F. The scrap in which has been incorporated a small amount of dicresyl polysulphide for a time sufficient to reduce the rubber to a plastic state where it has a Mooney viscosity of 80 to 180 when tested at 180° F.

6. A process for reclaiming scrap containing vulcanized rubber which comprises heating in a sub-divided condition at a temperature from about 300° F. to about 420° F. the scrap in which has been incorporated about .02 to 1% by weight of the scrap of a di (hydroxyaryl) sulphide for a time sufficient to reduce the vulcanized rubber to a plastic state where it has a Mooney viscosity substantially less than 200 when tested at 180° F.

7. A process for reclaiming scrap containing vulcanized rubber which comprises heating in a sub-divided condition at a temperature from about 300° F. to about 420° F. The scrap in which has been incorporated a small amount of a dicresyl sulphide for a time sufficient to reduce the vulcanized rubber to a plastic state where it has a Mooney viscosity substantially less than 200 when tested at 180° F.

8. A process for reclaiming scrap containing vulcanized rubber which comprises heating in a "digester" at a temperature from about 300° F. to about 420° F. The scrap in which has been incorporated a small amount of a di (hydroxyaryl) sulphide for a time sufficient to reduce the vulcanized rubber to a plastic state where it has a Mooney viscosity of 80 to 180 when tested at 180° F.

9. A process for reclaiming scrap containing vulcanized rubber which comprises heating in a "heater" at a temperature from about 300° F. to about 420° F. The scrap in which has been incorporated a small amount of a di (hydroxyaryl) sulphide for a time sufficient to reduce the vulcanized rubber to a plastic state where it has a Mooney viscosity of 80 to 180 when tested at 180° F.

WALTER G. KIRBY.
LEO E. STEINLE.

CERTIFICATE OF CORRECTION.

Patent No. 2,372,584. March 27, 1945.

WALTER G. KIRBY, ET AL.

It is hereby certified that error appears in the printed specification of the above numbered patent requiring correction as follows: Page 2, second column, lines 43, 61 and 69, page 3, first column, lines 2 and 19, and second column, lines 6 and 15, for "The" read --the--; and that the said Letters Patent should be read with this correction therein that the same may conform to the record of the case in the Patent Office.

Signed and sealed this 25th day of September, A. D. 1945.

Leslie Frazer (Seal)                      First Assistant Commissioner of Patents.